ially Patent

Petroskey

[15] 3,640,239
[45] Feb. 8, 1972

[54] FLOAT APPARATUS FOR BICYCLE

[72] Inventor: Paul P. Petroskey, 1121 Chicago Ave., Hammond, Ind. 46327

[22] Filed: May 27, 1970

[21] Appl. No.: 40,888

[52] U.S. Cl. ...........................................................115/27
[51] Int. Cl. .....................................................B63b 35/38
[58] Field of Search ................................................115/27, 2

[56] References Cited

UNITED STATES PATENTS 2,757,631   8/1956   Truter..........................................115/2
1,034,278   7/1912   Munsen.......................................115/2

FOREIGN PATENTS OR APPLICATIONS 316,629   12/1919   Germany...................................115/27

Primary Examiner—Andrew H. Farrell
Attorney—Walter Leuca

[57] ABSTRACT

A float apparatus for attachment to a conventional bicycle comprising a frame member having horizontally extending distal ends which are connected to laterally spaced pontoon floats. The frame member is acutely angled intermediate the distal ends thereof to obtain a vertically extending loop portion for bridging the front wheel of the bicycle. The upright legs of the loop portion of the frame member carry brackets adapted to connect to the front wheel axle by which means the front portion of the float apparatus is attached to the bicycle. A similarly formed second frame member is provided to support a second pair of pontoon floats laterally spaced apart. A horizontally positioned axle is connected between the second pair of float members and is provided with paddle wheels and a sprocket gear. A sprocket chain connects a sprocket on the rear wheel of the bicycle and the sprocket on the paddle wheel axle and is driven by pedaling the bicycle. A swively connected rubber device is clamped to the nadir part of the front wheel and is movably controlled by lines strung to the handlebars.

7 Claims, 14 Drawing Figures

INVENTOR.
PAUL P. PETROSKEY
BY Walter Lenca
ATTORNEY

INVENTOR.
PAUL P. PETROSKEY
BY Walter Lenca
ATTORNEY

PATENTED FEB 8 1972
3,640,239
SHEET 3 OF 3
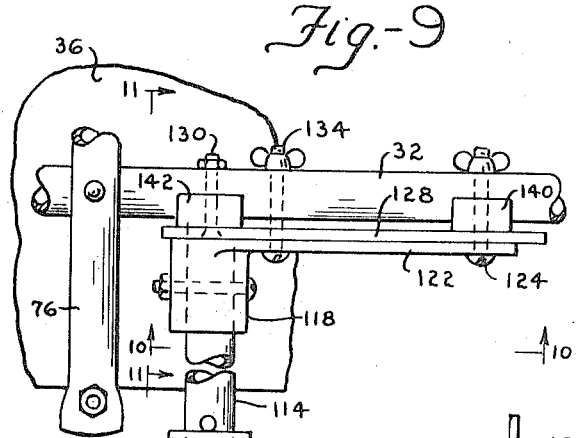
Fig.-9
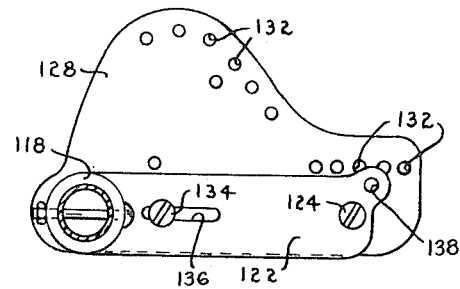
Fig.-10
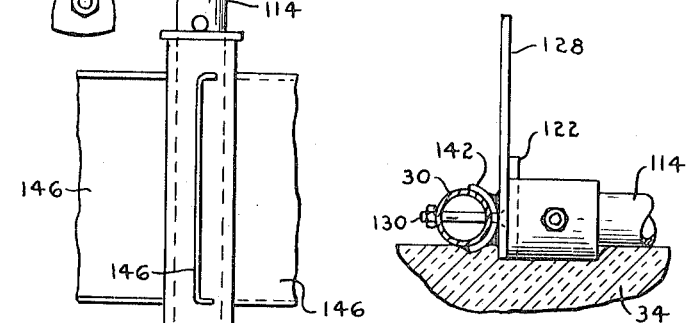
Fig.-11
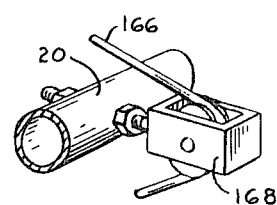
Fig.-12
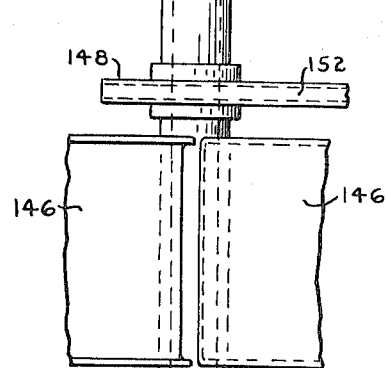
Fig.-13
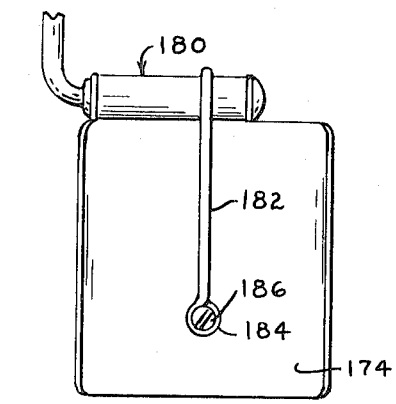
Fig.-14
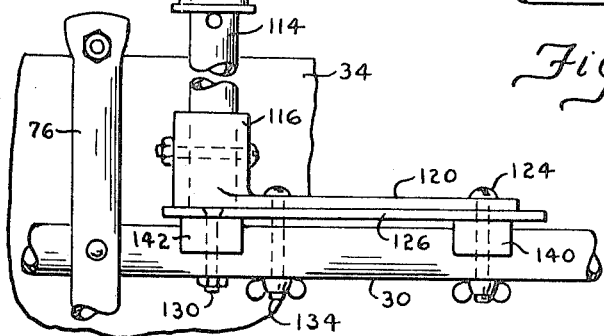
INVENTOR.
PAUL P. PETROSKEY
BY Walter Leuca
ATTORNEY 3,640,239

1

FLOAT APPARATUS FOR BICYCLE

BACKGROUND OF THE INVENTION

1. Field of the Invention

This invention relates to a float apparatus for a bicycle and more particularly to a float apparatus provided with propelling means actuated by the bicycle.

2. Description of the Prior Art

I am aware of bicyclelike structures supported on a float apparatus having water motive means driven by pedaling action of the operator. The prior art that I am familiar with, however, includes specially constructed bicyclelike structures which are especially adapted for the float apparatus. The float apparatus of the prior art are not adaptable to the conventional bicycle, and none of the bicyclelike structures of the prior art apparatus to which this invention pertains can be detached from the float apparatus to use in the conventional bicycle manner on land.

SUMMARY OF THE INVENTION

Accordingly, I have invented a float apparatus which has a novel structure enabling it to be attached to a conventional bicycle whereby the conventional bicycle is converted for aquatic use with the minimum change.

My invention also allows cycling on land allowing beach use thereof and thereby obtaining amphibian use of a conventional bicycle. I accomplish this by providing a framework which has connected thereto floats or pontoon members which serve to buoy the apparatus of my invention on water. Lateral bar members of the framework are acutely angled at the midportion to provide substantially vertically disposed leg portions to bridge the front wheel and the rear wheel of the bicycle. The respective leg portions are parallel and closely adjacent to the wheels and each have connected thereto bracket members which are adapted to connect to opposite ends of the front and rear wheel axles of the bicycle. By such simple means, the float apparatus of my invention is connected to the conventional bicycle. Also provided as part of the float apparatus at a position rearward of the bicycle is a horizontal axle mounted at the ends thereof between the aft float members on means adapted for vertical movement. Paddle wheels are provided on the horizontal axle and positioned thereon to straddle the rear wheel of the bicycle. The horizontal axle is also provided with a sprocket wheel which is driven by a sprocket chain connected to the rear wheel sprocket. A rudder is swivelly mounted to a base which is shaped to clamp at the nadir position of the front wheel. The rudder is movably controlled by pull lines connected to the handle bars of the bicycle.

Objects and advantages and the entire scope of applicability of my invention will become apparent from the detailed description given hereinafter, it being understood that the detailed description and the specific examples, while indicating a preferred embodiment of my invention is given by way of illustration only and is shown in the following drawings wherein like numerals refer to like parts throughout.

2

FIG. 9 is an enlarged plan view of the paddle drive means showing structural details thereof and showing the parts on which it is mounted in fragment;

FIG. 10 is an end view sectioned along lines 10—10 of FIG. 9 giving a side elevation of the drive means mount;

FIG. 11 is an end view of the drive means mount of FIG. 10 taken along section line 11—11 of FIG. 9;

FIG. 12 is a detail of a rudder line pulley connected to the horizontal frame member;

FIG. 13 is a frontal elevation of a pedal mount paddle which is an auxiliary motive assist; and FIG. 14 is a sectional end view of the pedal mount paddle taken along line 14—14 of FIG. 13.

DESCRIPTION OF THE PREFERRED EMBODIMENT

Figure 1:
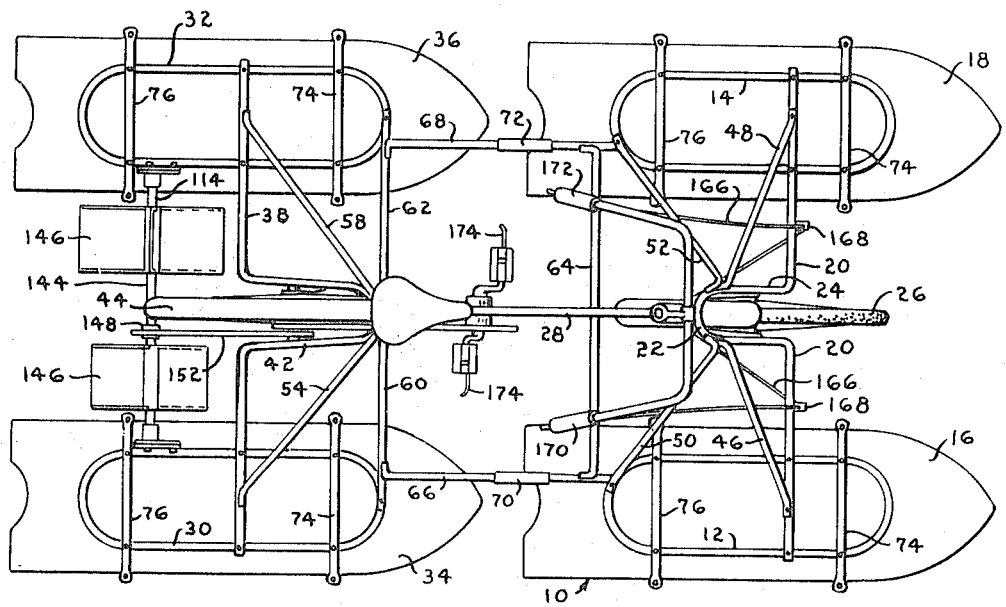
FIG. 1 is a plan elevation of my invention.
Figure 2:
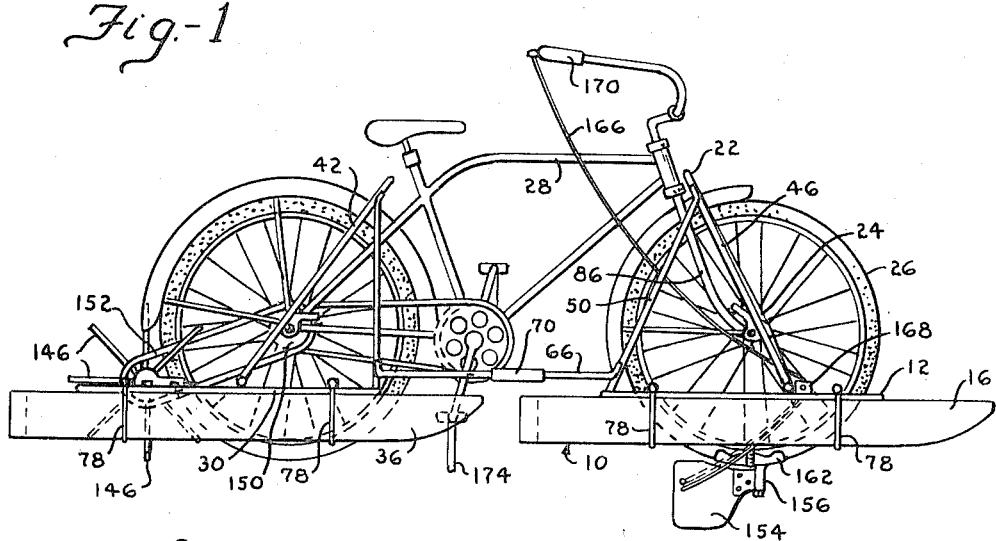
FIG. 2 is a side elevation thereof.
Figure 3:
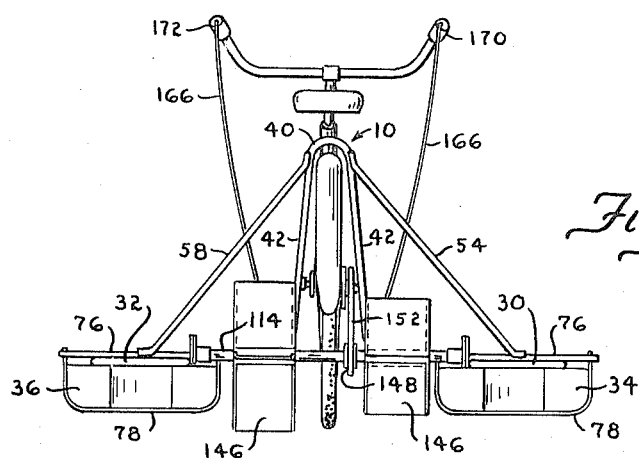
FIG. 3 is a rear end view.

Referring now by reference characters to the drawings, numeral 10 represents generally the float apparatus of my invention. Referring first to FIGS. 1–3, my invention 10 comprises a pair of tubular frame members 12 and 14, each shaped in a generally rectangular form as viewed in plan, and serve as support frames for pontoon floats 16 and 18, respectively. Generally rectangular frame members 12 and 14 are connected in laterally spaced relation by horizontally dispositive bar member 20 at the ends thereof. Intermediate the ends, bar member 20 is formed with an acutely angled loop portion 22 providing spaced and substantially parallel legs 24, positioned at an elevated incline and which bridges front wheel 26 of bicycle 28 to which the float apparatus 10 of my invention is attached. A second pair of tubular frame members 30 and 32 are similarly shaped in a generally rectangular form, and serve as support frames for pontoon floats 34 and 36, respectively. Frame members 30 and 32 are similarly connected in laterally spaced relation by horizontally dispositive bar member 38 at the ends thereof. Intermediate the ends thereof, bar member 38 is formed with an acutely angled loop portion 40 providing spaced and substantially parallel legs 42 positioned at an elevated incline and which bridges rear wheel 44 of bicycle 28. It is apparent that the frame members are formed from tubular bars to lighten the weight of the apparatus of my invention. Accordingly, reference or lack of reference to any of the frame members by the word tubular has no discriminatory significance. Diagonally dispositive brace members 46, 48, 50 and 52 connecting loop portion 22, bar member 20, and frame members 12 and 14; diagonally dispositive brace members 54, 48, 60 and 62, connecting loop portion 40 and bar member 38, and frame members 30 and 32; and rectangularly interconnected laterally and longitudinally horizontal brace member 64, 66 and 68, respectively, all serve to provide strength and rigidity.

The fore and aft pontoon frame members 12, 30 and 14, 32 respectively, are longitudinally aligned and connected in tandem position by means of longitudinally horizontal brace members 66 and 68. Slipover pipe or sleeve member 70 and 72 respectively, connect the ends of brace members 66 and 68 which are divided intermediate the ends thereof for the purpose of facilitating assembly of the float apparatus frame. Connection is made by any convenient fastening means which are releasable.

Connected to each of rectangular frame members 12, 14, 30 and 32, preferably on the top side thereof and laterally dispositive thereover, are forwardly and rearwardly placed pontoon support bars 74 and 76 which overhangingly extend thereover and distally coterminate with the sides of the pontoon floats. The distal ends of each support bars 74 and 76 are adapted to connect thereto the ends of a tough elastic cord 78. Pontoon floats 16, 18, 34 and 36 are connected to frame members 12, 14, 30 and 32 respectively merely by abutting the top planular surface of the pontoon floats to the frame members and tautly connecting elastic cords 78 around the underside of each of the pontoon floats to the distal ends of support bars 74 and 76 in straplike fashion.

Figure 4:
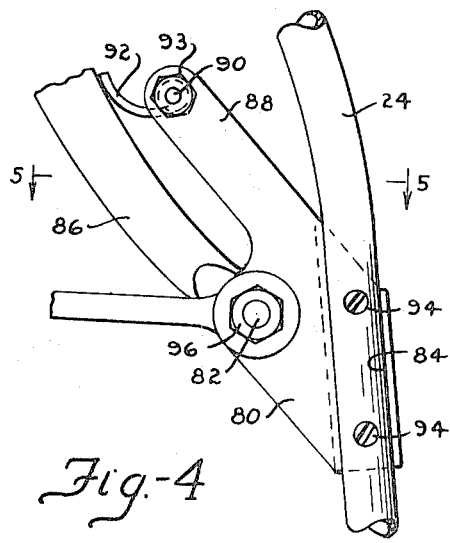
FIG. 4 is an enlarged view of the front wheel support bracket showing the details thereof, and the parts of the bicycle to which the bracket is connected are shown in fragment.
Figure 5:
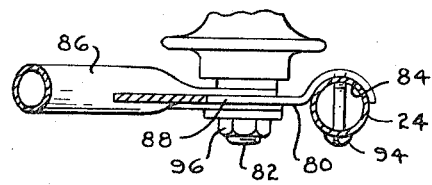
FIG. 5 is a cross section view of the bracket member of FIG. 4 sectioned along lines 5—5 thereof.

The uprightly legs 24 of horizontal bar member 20 are provided with screw holes for mounting thereto front wheel bracket pair 80. Bracket pair 80 are mounted on both sides of front wheel axle 82 of bicycle 28. FIGS. 4 and 5 show in greater detail the structure end connecting arrangement of one of the bracket pair 80, the other of which is not viewable but is identical in structure except opposite handed. Accordingly, a description of one of the bracket pair 80 will suffice to describe the other. Bracket pair member 80 is formed from plate material of sufficient area stock to provide a hole through which front wheel axle 82 is received therethrough. Forwardly spaced from the axle hold provided therein is a semicylindrical groove 84. Extending in a direction substantially parallel to the fork bar member 86 of bicycle 28 is lever element 88 which is provided at the end thereof with a hole through which extends the threaded shaft end 90 of adjustably positioned curved bar 92. Nut 93 is threadedly connected to end 90 and tightened to fix curved bar 92 in a select inclined position against fork bar member 86. Changing the inclined position of curved bar 92 against fork bar member 86 changes the angular posture of bracket 80 about bicycle wheel axle 82 and with it the legs 24 of bar member 20, since semicylindrical groove 84 of bracket 80 receives therein the upright leg 24 of horizontal frame bar member 20 and is fixed therein by means of screws 94. Bracket members 80 is secured to front wheel axle 82 by means of nut 96 threaded on the end thereof.

Figure 7:
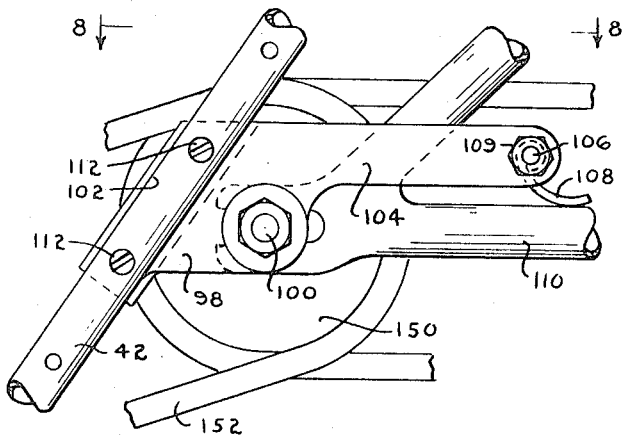
FIG. 7 is an enlarged view of the rear wheel support bracket showing the details thereof, and the parts of the bicycle to which the bracket is connected are shown in fragment.
Figure 8:
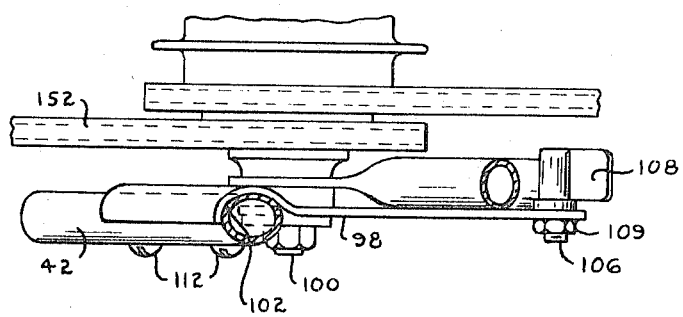
FIG. 8 is a top view of the rear wheel bracket of FIG. 7 taken along lines 8—8 thereof.

Mounted on upright legs 42 of horizontal bar member 38 are rear wheel bracket pair 98. FIG. 7 and 8 show in greater detail the structure and connecting arrangement of one of the bracket pair members 98, the other of which is not viewable but is identical in structure except opposite handed since it is connected to the other end of rear wheel axle 100. Rear wheel bracket 98 is also formed from plate material having a hole for receiving therethrough rear wheel axle 100. Rearwardly spaced therefrom is a semicylindrical groove 102 in which is fitted the upright leg 42 of horizontal frame bar 38. Bracket pair member 98 is formed with a forwardly extending lever element 104, the distal end of which is provided with a hole through which extends the threaded shaft end 106 of adjustably positioned curved bar 108. Nut 109 is threadedly connected to end 106 and tightened to fix curved bar 108 in a select inclined position against horizontal frame member 110 of bicycle 28. Upright leg 42 of horizontal bar member 38 is fitted in semicylindrical groove 102 of bracket 98 and connected therein by means of screws 112. Curved bar 108 is fixed to bear against horizontal frame member 110 of bicycle 28 so that changing the angular position thereof changes the angle of bracket 98 and with it horizontal bar member 38 to adjustably position rear pontoon floats 34 and 36 horizontally.

Again referring generally to FIGS. 1 to 3, and in detail to FIGS. 9 to 11, the motive means for the float apparatus 10 of my invention includes horizontal shaft 114 the ends of which are connected to laterally spaced rear pontoon frame members 30 and 32. The ends of shaft 114 are seated in cylindrically recessed bosses 116 and 118 formed at the end of shaft pivot levers 120 and 122 respectively. Shaft pivot lever 120 and 122 are connected to the inside tubular bars of frame members 30 and 32 respectively, by means of screw connections 124. Interposed between pivot levers 120 and 122 and frame members 30 and 32 are lock adjustment plates 126 and 128 respectively, which are connected to frame members 30 and 32 respectively, by screws 130 and by means of pivot screws 124 of pivot levers 120 and 122. Lock adjustment plates 126 and 128 are provided with a plurality of holes 132 so that when lock screws 134 are removed to allow pivot levers 120 and 122 to be pivoted on pivot screws 124, slotted apertures and 136 formed in pivot levers 120 and 122, may be aligned with any one of said plurality of holes 132 of lock adjusting plates 126 and 128, respectively, to adjustably position shaft 114 upward, forward or rearward or any combination thereof within the limits of said slots and holes. The horizontally aligned holes 132 in lock plates 126 and 128 may be utilized to take up the slack of the drive chain 152. I also provide a second pivot hole 138 in pivot levers 120 and 122 to allow additional adjustment. Lock adjusting plates 126 and 128 are further formed with concavely recessed bosses 140 and 142 for seating against the tubular bars of frame members 30 and 32 and thereby assist the hold connection of screws 124, 130 and 134. I provide a tubular section 144 rotatably mounted on shaft 114. Tubular section 144 is fitted with radially extending paddle vanes 146. Also fixed on tubular section 144 is chain sprocket 148. Any conventional bicycle may be fitted with an additional sprocket such as sprocket 150 shown in FIG. 7 and the adaption may be made with the minimum change in structure. However, conventional bicycles equipped with clutch drive are already provided with multiple sprockets and in this event sprocket chain 152 may be connected to one of the existing sprockets on the rear bicycle wheel and sprocket gear 148 of tubular section 144.

Figure 6:
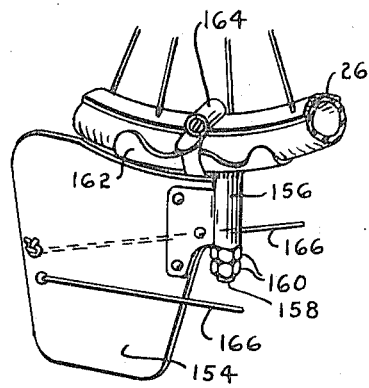
FIG. 6 is a perspective view of the rudder device shown swivelly connected to the front wheel which is shown in fragment.

Steering is accomplished by means of a rudder device comprising a rudder vane 154 which is provided with a pintle sleeve 156. Pintle sleeve 156 receives therethrough pintle shaft 158 with a clearance to allow swivel motion. Pintle shaft 158 is threaded at the end for receiving a lock nut assembly 160 which connects the rudder vane 154 to the pintle shaft 158. Pintle shaft 158 depends from support base 162 which is shaped with a longitudinal curve and a lateral bend to match the radius of the bicycle wheel and the cross section curvature of the tire thereof. This is clearly shown in FIG. 6 of the drawing. The rudder is connected to the front wheel 26 of bicycle 28 by means of clamp 164. A pair of cords 166 are connected to each side of rudder vane 154, over forwardly placed pulleys 168 mounted on horizontal bar member 20 and the other end of cords 166 are connected to the end of handle bars 170 and 172. By pulling the end of either of cord 166 at handle bars 170 or 172, rudder vane 154 is pivoted sideways to effect turning of the float apparatus 10 of my invention.

I provide an additional propelling means which is simple in construction and easy to install as an assist to the paddle vanes 146 driven by sprocket chain 152. As more clearly shown in FIGS. 13 and 14, the additional propelling means consists of a platen 174, preferably rectangular in shape, having a top portion 176 thereof formed with right-angled corners to overlap forward tread 178 of the conventional bicycle pedal 180. Brace pin 182 is shaped to include an eyelet 184 at one end thereof. A hole in platen 174 is also provided aligned with eyelet 184 through which fastening screw 186 is inserted for connecting brace pin 182 to platen 174. Brace pin 182 is bent to angle away from platen 174 and the other end of pin 182 is curved with a radius to match the center shaft 184 of pedal 180. The assembly of platen 174 to bicycle 180 is accomplished rapidly and easily by snaking the top portion 176 of platen 174 between the forward tread 178 and center shaft 184 of pedal 180. The angled section of top portion 176 of platen 174 is snugly fitted over the forward rectangular tread 178 of pedal 180. The curved end of pin 182 is inserted between the rear tread of pedal 180 and center shaft 184 and hooked over center shaft 184 which serves as an anchor.

It is obvious that the float apparatus 10 of my invention, a preferred embodiment of which is described and illustrated, may easily and rapidly be attached to any conventional bicycle by merely straddling the inclined loop portion 22 and 40 of bar members 20 and 38 over front and rear wheels 26 and 44 respectively. Connection is effected by mounting bracket pairs 80 and 98 to the front and rear wheel axles 82 and 100 respectively, by simply removing and replacing the wheel axle nuts; and connecting the forward and rearward frame members 12, 14 and 30, 32 by longitudinal and lateral brace members 66, 68 and 64 respectively, a rigid lightweight pontoon frame structure is obtained for supporting conventional bicycle 28. By simple angular adjustment of curved bars 92 and 108 on bracket pairs 80 and 98 respectively, which are made to bear against conventional frame members of the bicycle at a select angular posture, the forward and the rearward bar members 20 and 38 may be adjustably angled or tilted so that pontoon floats 16, 18 and 34, 36 respectively, are horizontally adjusted. By connecting sprocket chain 152 to an added sprocket 150 on the rear wheel of bicycle 28, or sprocket 150 may be an existing multiple sprocket, the pedaling of the bicycle in the conventional manner will drive sprocket chain 152 which will rotate paddle vanes 146 to propel the float apparatus 10 of my invention over the water. Support bracket pairs 80 and 98 are connected to the upright legs 24 and 42 of frame bars 20 and 38 respectively so that the front and rear wheels 26 and 44 of bicycle 28 extend below pontoon floats 16, 18 and 34, 36. This allows rudder vane 154 which is connected to the nadir part of front wheel 26 to be sufficiently submerged in the water to serve effectively as a rudder. By removing the rudder device from front wheel 26 which is accomplished simply by loosening clamp 164 as more clearly shown in FIG. 6, and by raising shaft 114 as far as possible by disconnecting wing nutted screws 134 from pivot levers 120 and 122, and reinserting wing nutted screws 134 in any of holes 132 provided in lock plate 126 and 128 for keeping shaft 114 in the elevated position; and by removing pedal platens 174 which as described above is easily and simply accomplished, the bicycle may be operated on land even with the float apparatus 10 attached thereto, and thereby be made amphibious in operation. In order to prevent front wheel 26 from rotating due to the drag force of water acting on the front wheel, and to insure that rudder vane 154 remains submerged in the water, I lock front wheel 26 by any convenient manner, such as strapping (not shown) front wheel 26 to any convenient stationary member of the bicycle. If the bicycle 28 were equipped with handle bar brake levers, I would provide a ring member for each handle bar 170 and 172 which fits over the brake levers to keep the brake levers in braking position.

I claim:

1. A float apparatus for a bicycle comprising:
a pair of float means;
a bar member connecting said float means in laterally spaced relation;
said bar member being acutely angled at the center portion thereof to provide a loop for straddling the forward wheel of said bicycle;
bracket members on said bar member connected to the forward wheel axle of said bicycle;
a second pair of float means;
a second bar member connecting said second float means in laterally spaced relation;
said second bar member being acutely angled at the center portion thereof to provide a loop for straddling the rear wheel of said bicycle; and
bracket members on said second bar member connected to the rear wheel axle of said bicycle.

2. The float apparatus of claim 1 wherein each of said bracket members on said bar members connected to the said forward and rear wheel axles is further characterized as having an adjustably movable element bearing against a frame member of said bicycle to angularly position said bar members relative to said axles.

3. A float apparatus for a bicycle comprising:
a pair of float means;
a bar member connecting said float means in laterally spaced relation;
said bar member being acutely angled at the center portion thereof to provide means for straddling the forward wheel of said bicycle;
bracket members on said bar member connected to the forward wheel axle of said bicycle;
a second pair of float means;
a second bar member connecting said second float means in laterally spaced relation;
said second bar member being acutely angled at the center portion thereof to provide means for straddling the rear wheel of said bicycle;
bracket members on said second bar member connected to the rear wheel axle of said bicycle;
an axle shaft extending between said second pair of floats;
rotatable impeller mounted on said axle shaft; and
drive means connecting a sprocket on said rear wheel of said bicycle and said axle shaft.

4. The float apparatus of claim 3 wherein each of said bracket members on said bar members connected to said forward and rear wheel axles is further characterized as having an adjustably moveable element bearing against a frame member of said bicycle to angularly position said bar members relative to said axles.

5. A float apparatus for a bicycle comprising:
a bar member straddling the forward wheel of said bicycle;
the distal ends of said bar member being laterally spaced from said forward wheel of said bicycle;
bracket members provided on said bar member for connecting said bar member to the axle of said forward wheel of said bicycle, said bracket members each including a lever and an adjustably moveable element bearing against a frame member of said bicycle for angularly positioning said bar members;
float members supported on the distal ends of said bar member;
a second bar member straddling the rear wheel of said bicycle;
the distal ends of said second bar member being laterally spaced from said rear wheel of said bicycle;
bracket members provided on said second bar member for connecting said second bar member to the axle of said rear wheel of said bicycle, said bracket members including a lever and an adjustably moveable element bearing against a frame member of said bicycle for angularly positioning said bar members;
float members supported on the distal ends of said second bar member;
a shaft supported on said second mentioned float members;
rotatable propelling members on said shaft between said float members; and
drive means connecting said propelling members and said rear wheel of said bicycle.

6. A paddle assist for a float apparatus for a bicycle comprising a platen member, one end thereof being angled for fitting over the forward tread of the foot pedal of said bicycle, and a bar member curvilinearly formed to connect said platen member at a lower portion thereof at one end of said bar member, and to connect the center shaft of the pedal of said bicycle with the other end of said bar member.

7. The paddle assist of claim 6 wherein the angled end of said platen member is further characterized as being angled with corners to fit on three sides of said forward tread of the pedal of said bicycle.

* * * * *